UNITED STATES PATENT OFFICE.

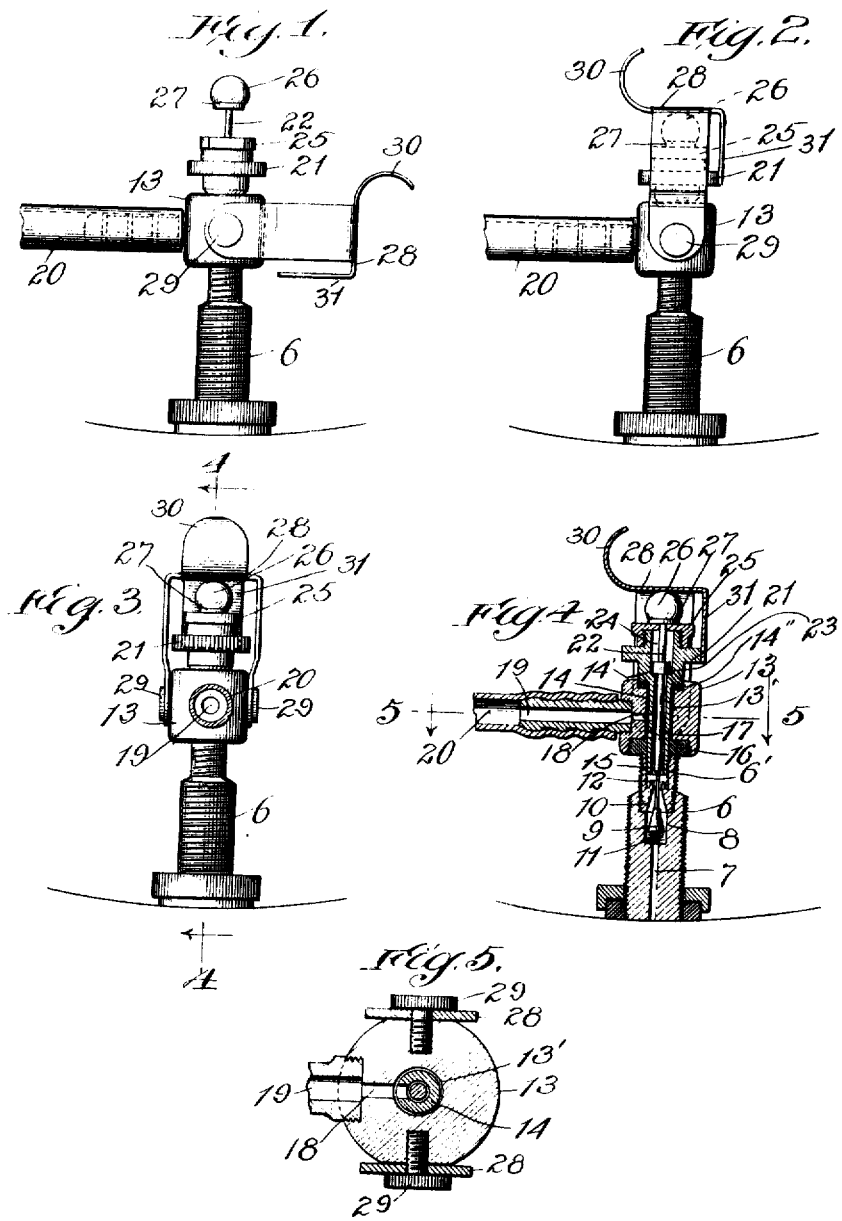

CHARLES L. BASTIAN, OF CHICAGO, ILLINOIS.

PUMP CONNECTION.

No. 912,274.  Specification of Letters Patent.  Patented Feb. 16, 1909.

Application filed April 6, 1907. Serial No. 366,652.

*To all whom it may concern:*

Be it known that I, CHARLES L. BASTIAN, a citizen of the United States, residing at Chicago, in the county of Cook and State of Illinois, have invented new and useful Improvements in Pump Connections, of which the following is a specification.

This invention relates to pump connections and it is particularly adaptable for pumps commonly employed to inflate tires.

Pneumatic tires are commonly provided with normally closed valves which are opened when the pump connection is screwed thereon. While the connection is being unscrewed from the valve the spring returns the valve to its seat but there is a period of time during which the air may escape through the screw-threads on the valve and the connection while the latter is being unscrewed and before the valve has been returned to its seat and if the thread is slightly worn a considerable amount of air will escape from the tire. Sometimes the pressure of the air from the pump is relied upon to open the tire valve but this is not altogether satisfactory because the valve frequently sticks and some mechanical means for opening the valve after the connection is secured in place is very desirable.

It is my object to provide for opening the tire valve after the pump connection has been secured thereto and for permitting the tire valve to close before commencing to unscrew the connection. In other words my invention has for its object to make the operations of opening and closing the tire valve entirely independent of the operations of fastening the connection to the valve and removing it therefrom.

In the accompanying drawings Figure 1 is a side elevation showing the connection just after it has been screwed into place on the tire valve and before the valve is opened. Fig. 2 is a similar view showing the yoke of the connection swung up into position to open the valve. Fig. 3 is a front elevation. Fig. 4 is a sectional view on the line 4—4 of Fig. 3. Fig. 5 is a sectional view on the line 5—5 of Fig. 4.

Referring to the drawings, 6 designates one end of the tire tube which is provided with a bore 7 and a chamber 8, the latter inclosing a conical valve 9 normally pressed to its seat 10 by a spring 11 and having a stem 12 which projects outward beyond the seat 10 and within the interiorly threaded upper end 6' of the tire tube.

The body 13 of the connection is provided with a central bore 13' to receive a tubular plug 14 which fits loosely within the bore 13' and is provided with a conical shoulder 14' which engages a seat 14'' on the body 13. The lower end 15 of the tubular plug is screw-threaded and projects beyond a threaded gasket 16 held in place in the body, the end 15 of the plug being adapted to enter the end 6' of the tire valve tube and the gasket 16 forming a seat for the end of the tire valve tube. The tubular plug is provided with a plurality of lateral ports 17, one of which preferably alines with a port 18 in the body which communicates with a tubular arm 19 to which the pump hose 20 is connected. The upper part of the tubular plug is provided with knurled flange 21 which forms a head to facilitate screwing the plug into the tire tube.

A slidable rod 22 is arranged within the tubular plug and is provided with a collar 23 which operates within a chamber 24 in the upper end of the plug to limit the movement of the rod. A cap 25 is screwed on the upper end of the plug and the rod projects upward through this cap and is provided with a round head 26 and a gasket 27. A yoke 28 is pivotally mounted on the body by screw pins 29 and is adapted to swing over and bear upon the head 26. This yoke has an upturned handle 30 and a flange 31 which forms a stop arranged to engage the head 21 or other part of the device to limit the swinging movement of the yoke.

In practice the connection is attached to the tire valve tube by screwing the lower end of the plug into the upper end of the tube until the upper end of the tube is seated tightly against the gasket 16 to form an air tight connection. The spring 11 holds the valve 9 seated and the rod 22 is pushed upward by the spring-pressed stem 12 as the connection is screwed into place on the tire tube (Fig. 1). The yoke is then swung into engagement with the head 26 on the sliding rod and it forces the rod inward and unseats the valve 9 (Fig. 4). After the tire has been inflated the yoke is swung downward and the air pressure in the tire and the spring 11 will re-seat the valve 9 and at the same time push the rod upward to the position shown in Fig. 1.

Then the connection is removed from the tire tube. It will be observed that the valve is not unseated until after the connection has been properly secured on the tire tube, and that the valve is re-seated before a start is made to unscrew the connection. This provides for positively unseating the valve to permit the tire to be inflated and allows the valve to be quickly re-seated and avoids the liability of air escaping while the connection is being removed. The air enters the tire tube through the tubular arm 19, the ports 18 and 17, the tubular plug 14 and the chamber 8.

What I claim and desire to secure by Letters Patent is:

1. A pump connection comprising a body having an air passage therein, a rod slidably arranged in said body and provided with a rounded head, a yoke pivoted on the body and adapted to move the rod lengthwise when swung into engagement with said head, said yoke having an upwardly curved handle at the front of its bend, and a stop at the back of the yoke to limit its forward movement.

2. The combination with an interiorly threaded tire valve tube, a spring-pressed valve in said tube, and a stem on said valve, of a pump connection comprising a body having a bore and a port therein, a tubular plug secured in said bore and projecting below the body to screw into the tire valve tube, said plug having a port and a chamber therein, a cap over said chamber, a rod slidably arranged in said plug and projecting through the cap, a rounded head on said rod, a collar on the rod within the chamber, and a yoke pivoted on the body and adapted to move the rod lengthwise when swung into engagement with the head.

CHARLES L. BASTIAN.

Witnesses:
 Wm. O. Belt,
 M. A. Kiddie.